United States Patent
Erlandson

[15] 3,654,422
[45] Apr. 4, 1972

[54] SQUARE WAVE RESISTANCE WELDING

[72] Inventor: Paul M. Erlandson, Palos Park, Ill.
[73] Assignee: Continental Can Company, Inc., New York, N.Y.
[22] Filed: July 26, 1966
[21] Appl. No.: 568,022

[52] U.S. Cl. .................................................. 219/81, 219/83
[51] Int. Cl. ................................................... B23k 11/06
[58] Field of Search ............... 219/81, 82, 83, 67, 108, 109, 219/110, 113, 114

[56] References Cited
UNITED STATES PATENTS 1,478,302  12/1923  Snodgrass et al. .................. 219/67 X
2,344,086  3/1944   Hagedorn et al. .................. 219/108 X
1,230,114  6/1917   Cary ................................. 219/83
1,534,133  4/1925   Murray, Jr. ........................ 219/59 X
1,553,727  9/1925   Sjobring et al. ................... 219/59
2,647,981  8/1953   Wögerbauer ....................... 219/59
2,882,384  4/1959   Foster .............................. 219/59 X Primary Examiner—J. V. Truhe
Assistant Examiner—George A. Montanye
Attorney—Diller, Brown, Ramik & Holt

[57] ABSTRACT

A method and apparatus for resistance welding of lapped workpieces using square wave power, wherein the power to the weld is supplied in the form of controlled bursts of waveforms through opposed welding electrodes.

2 Claims, 28 Drawing Figures

PATENTED APR 4 1972

INVENTOR
PAUL M. ERLANDSON

BY
Mason, Porter, Diller & Brown
ATTORNEYS

INVENTOR
PAUL M. ERLANDSON

BY Mason, Parter, Willen & Brown
ATTORNEYS

INVENTOR
PAUL M. ERLANDSON

BY
Mason, Porter, Diller & Brown
ATTORNEYS

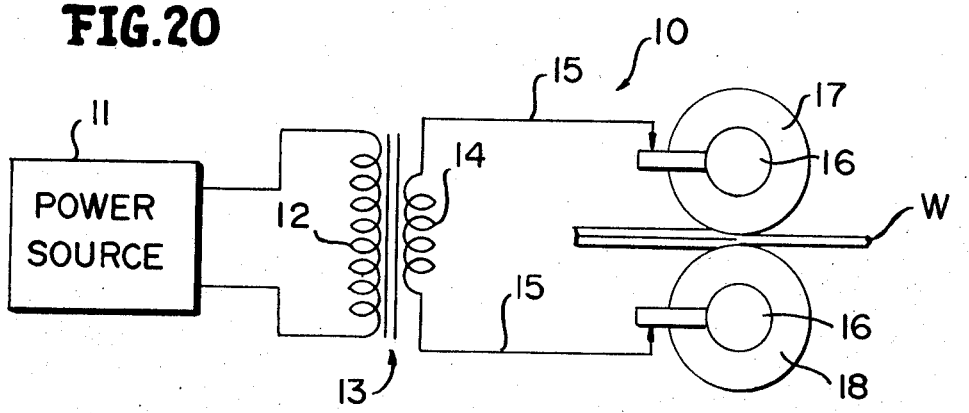
FIG.20
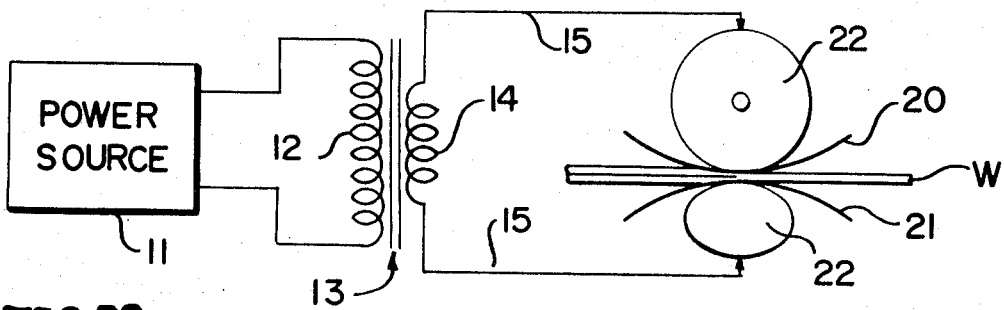
FIG.21
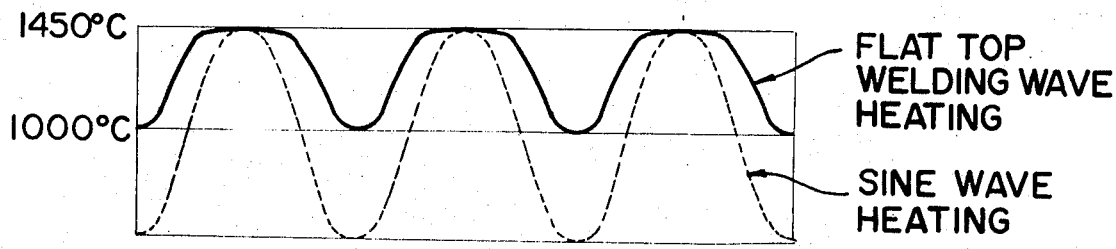
FIG.22
FIG.23
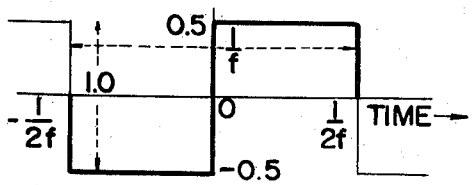
FIG.24
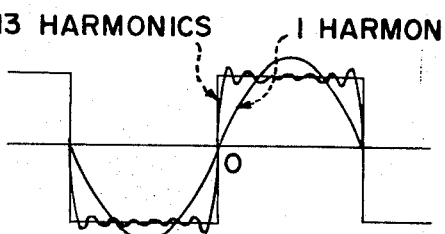
FIG.25
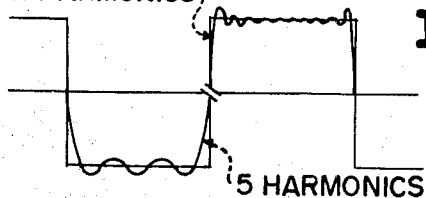
INVENTOR
PAUL M. ERLANDSON

SQUARE WAVE RESISTANCE WELDING

This invention relates in general to new and useful improvements in resistance welding methods and apparatus, and more particularly to a novel method and apparatus for forming a continuous seam weld in lapped portions of work.

This invention particularly relates to the provision of a resistance welding apparatus which may be utilized in the continuous seam welding of lapped sheet metal edge portions wherein the heating effect of current applied by the welding apparatus is sufficient to heat the lapped edges to a temperature closely approaching, but essentially short of the melting temperature of the metal and at the same time wherein the sheet metal is continuously heated along the seam to a temperature sufficiently high to permit the continuous forge welding thereof together in a short time.

In the past continuous resistance seam welding has been attempted either utilizing a continuous direct current or by means of a conventional alternating current, or by spikes of energy. Although the direct current may produce the necessary heating of the work due to the constant level of the energy passing into the work, direct current has proved to be undesirable in continuous seam welding in that arcing between the electrodes and the work has not been prevented and with direct current, once arcing occurs, it may continue until the current is turned off or interrupted. Such arcing results not only in a poor appearing weld, but also in very short electrode life. Accordingly, direct current has been restricted in resistance welding primarily to the welding of spots through the application of single current pulses or a series of isolated square pulses being applied to the work at spaced predetermined intervals.

Alternating current has been commercially utilized in continuous seam welding where melting of the work is permitted. However, when melting occurs, there is an absorption of carbon from the surrounding area in the case of ferrous metals with the result that hard weld nuggets are formed. A seam containing the hard weld nuggets is more readily subject to rupture, particularly when a bending force is applied transversely of the seam.

On the other hand, if melting is not desired, conventional alternating current will not provide a continuous weld at commercially acceptable welding speeds. This is due to the fact that with the sine wave current pulse of ordinary alternating current, the rise time is very long as compared to the time wherein peak current flow occurs. In view of the fact that the heating energy is directly proportional to the square of the amperage, the deficiencies of the sine wave currents are exaggerated. As a result, unless the frequency of the current is extremely high as compared to the rate of welding, when there is no melting, the resultant weld will be in the from of spaced apart welded areas, with there being gaps in between. When the deficiencies of the sine wave current flow of alternating current are overcome to a partial degree by greatly increasing the frequency, and wherein the rate of welding is desirably high so as to be economically feasible, the high frequency of the current poses a serious problem both with respect to current flow through the work being welded and power losses due to the effect of high frequency on the inductances of the welding transformer secondary and the leads from the welding transformer to the electrodes, as well as losses induced into the welding apparatus.

In view of the foregoing, it is the object of this invention to provide novel resistance welding methods and apparatus which eliminate the aforementioned disadvantages of both direct current and conventional types of alternating current by providing in a resistance welding apparatus a source of electrical current which will apply to the workpiece a finite burst or a continuous train of power waves generally of the square wave type and having substantially flat tops whereby a peak current will be applied to work for a maximum time during each wave of power. Since the waves of this invention have substantially flat tops, notwithstanding the heating capacity of the current is directly proportional to the square of the amperage, there will not occur the undesired limiting of energy output as in the case wherein the current flow characteristic is that of a sine wave.

Another object of this invention is to provide a resistance welding method and apparatus for forming a continuous seam weld wherein the welded seam may be formed at a commercially acceptable rate and at the same time the temperature of the metal of the seam is at all times retained above that required to make the metal plastic for welding under pressure and yet below the melting temperature of the metal whereby a continuous forge weld may be readily formed while retaining long life for the welding electrodes.

With the above and other objects in view that will hereinafter appear, the nature of the invention will be more clearly understood by reference to the following detailed description, the appended claims and the several views illustrated in the accompanying drawings:

IN THE DRAWINGS:

FIG. 17A is a sectional view diagrammatically showing the stitching effects commonly obtained in roll seam welding.

FIG. 17B is a sectional view diagrammatically showing the stitching effects commonly obtained in roll spot welding.

FIG. 20 is an elevational view diagrammatically showing the resistance welding apparatus of this invention wherein the electrodes are roller electrodes.

FIG. 21 is an elevational view similar to FIG. 1 and shows a similar resistance welding apparatus wherein the welding electrodes are in the form of ribbons which move with the work.

FIG. 22 is a diagram comparing the heating of a rapidly moving strip when heated by ordinary alternating current and when heated by current having an amperage curve of the flat top type.

FIG. 23 is a diagram of an ideal square wave.

FIG. 24 is a diagram of an ideal square wave, and the waveform of a single harmonic (one term) and that of 13 harmonics (seven terms), all arranged in superimposed relation.

FIG. 25 is a diagram of an ideal square wave and the waveform of five harmonics (three terms) and 21 harmonics (11 terms), arranged in superimposed relation.

Referring now in detail to the drawings, it is again emphasized that in the past, power waveforms consisting of spikes, pulses, and other sharp-featured contours have mistakenly been advocated on such grounds as enhancing the easy rupturing of surface oxide films by momentarily exceeding the known desirable voltage, current, etc. power levels for welding.

Figure 1:
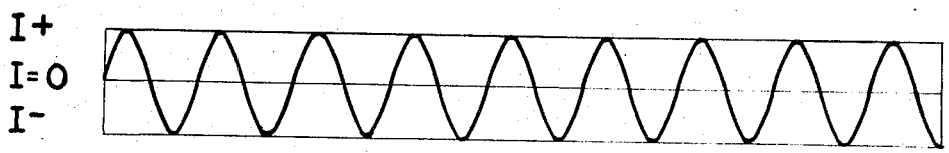
FIG. 1 is a diagram plotting a power waveform of continuous sine waves vs. time.

The most commonly advocated waveform however, has been the current or voltage sinusoid as shown in FIG. 1. That figure shows a continuous stream of sine waves having a maximum positive value I+ and a maximum negative value I−, and passing through a value of current I=0 at 0, 180, and 360 electrical degrees of each cycle.

Figure 2:
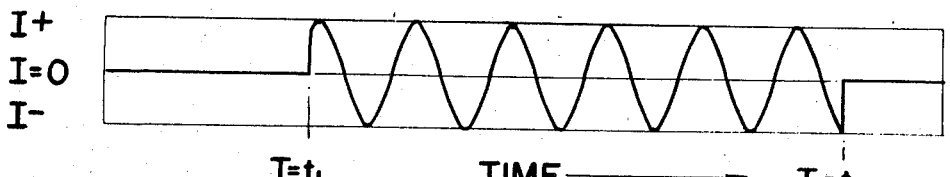
FIG. 2 is a diagram plotting a power waveform of an interrupted train of sine waves vs. time, with no phase control of the sine wave.
Figure 3:
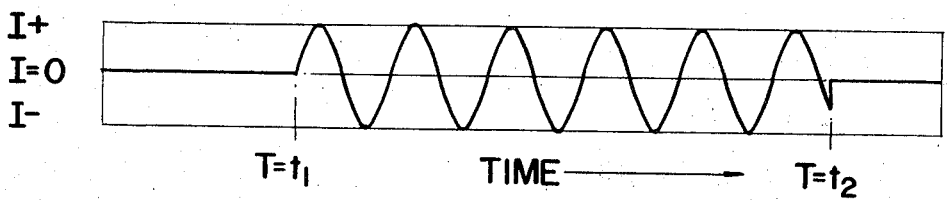
FIG. 3 is a diagram plotting a power waveform of an interrupted train of sine waves, with phase control, vs. time.

Using the same nomenclature, FIG. 2 shows a burst or limited train of power waves, as if the wave of FIG. 1 was turned on suddenly at time $T=t_1$ and turned off suddenly at time $T=t_2$. In this example whatever phase of the sine wave that happens to exist at the time $T=t_1$ is accepted. However, the example in FIG. 3 shows a similar train of waves except that the phase of the sinusoid has been specified to be 0° at the instant the burst of sine waves is begun. In both FIGS. 2 and 3, the phase of sine wave at time $T=t_2$ depends on the selection of the time $T=t_2$. Unless the time of the overall burst or train is deliberately chosen with respect to the frequency of the sine wave, it is not possible independently to specify the duration of the burst, the phase at its initiation, and the phase at its ending. In welding practice, the burst of power needed to weld a discrete object may be turned on by a mechanical switch which cannot be phased relative to the power line frequency, so that the phase of the sinusoid relative to each burst may differ in some random manner.

Figure 4:
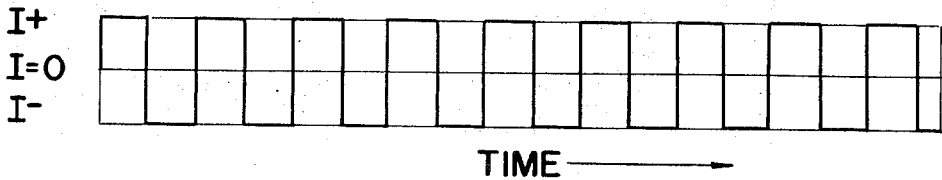
FIG. 4 is a diagram plotting a power waveform of continuous square wave vs. time.

FIG. 4 shows a continuous stream of square waves having the same maximum and minimum values as the waves of FIGS. 1, 2, and 3. It should be noted that the square waves pass through a value of current I=O at 0, 180, 360 and electrical degrees in the same manner as the sinusoid of FIG. 1.

Figure 5:
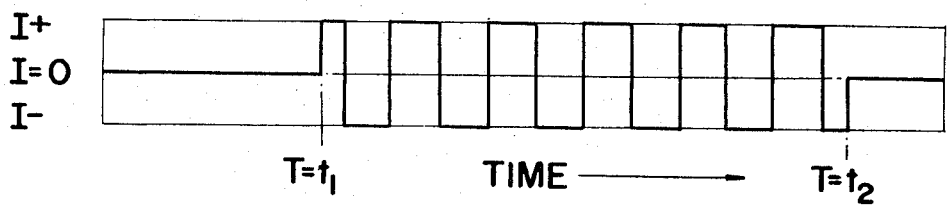
FIG. 5 is a diagram plotting a power waveform of a burst or train of square waves vs. time.

FIG. 5 shows a burst or a limited train of square waves suddenly turned on and off in the same manner, at the same times, as the sine waves of FIGS. 2 and 3.

Figure 6:
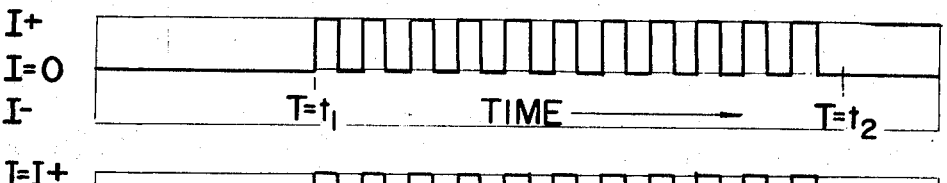
FIG. 6 is a diagram plotting a current waveform of a burst of square pulses vs. time.
Figure 7:
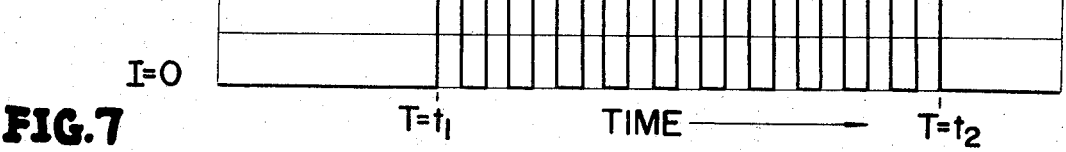
FIG. 7 is a diagram plotting a current waveform of another burst of square pulses vs. time.

FIG. 6 shows a burst or limited train of square pulses — distinguished from the train of square waves by the fact that the maximum negative value I = I− is never attained. In fact, in the example shown the current never assumes a negative value of any magnitude — being either positive or zero. The same is true for the burst or train of square pulses shown in FIG. 7, which has twice the amplitude of that of FIG. 6 for further comparison with FIGS. 4 and 5. Again, the waveform of FIG. 7 never assumes a negative value. Putting it another way, the current is unidirectional — only flowing in one direction. It will be noted that in both FIGS. 6 and 7, the value of I is equal to zero for an appreciable fraction of the total time.

Figure 8:
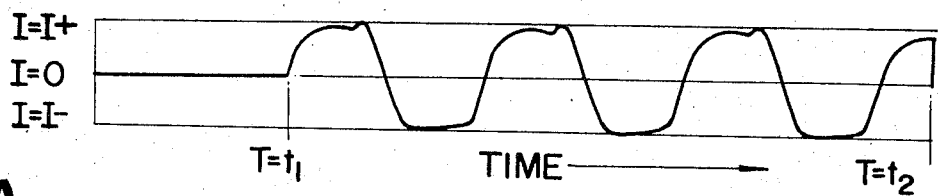
FIG. 8 is a diagram plotting a current waveform of a burst of practically attainable square waves vs. time.
Figure 8A:
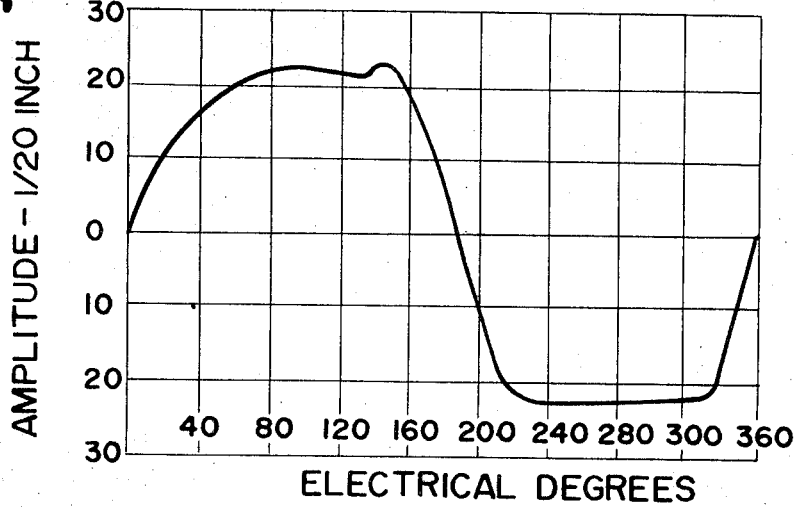
FIG. 8A is an enlargement of the wave of FIG. 8, only 360 electrical degrees of the wave being shown.

FIGS. 8 and 8A show a waveform which is obtained at a welding station in accordance with this invention which waveform is not a "perfect" square wave. It should be realized that a perfect square wave is a mathematical idealization.

The current goes from zero to a positive maximum value (I=I+) in an infinitely short time. Other ways of expressing this same idealization are to state that the slope of the current wave is infinite, or to say $di/dt = \infty$. It is well known that such an abstraction cannot be realized physically. On the other hand, one may approach as closely to this ideal as may be permitted by the state of the art of electrical or electronic components, etc. In the following reference is made to practical square waves which require finite, but short times to change from I=O to I=I+, from I=I+ to I=O, etc.

Figure 9:
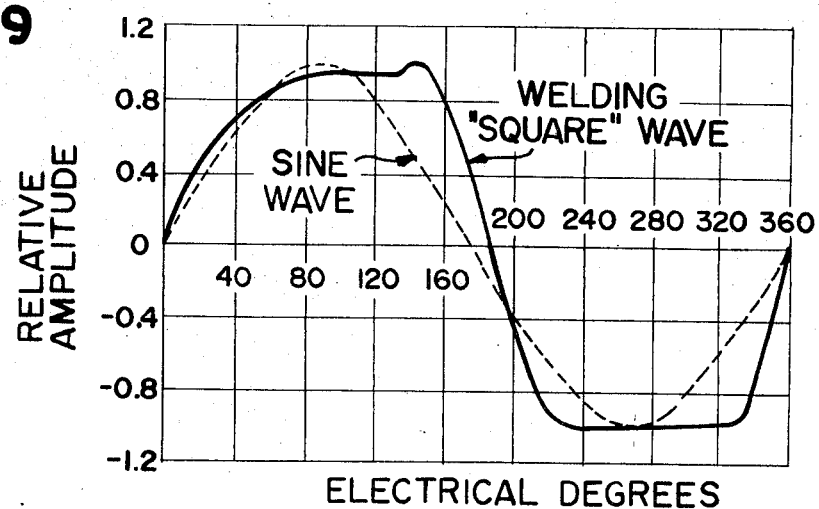
FIG. 9 is a diagram plotting a sine wave and a practically obtainable square wave for welding purposes.
Figure 9A:
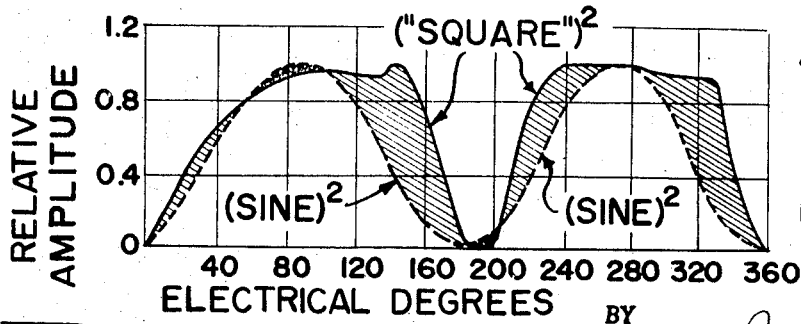
FIG. 9A is a diagram plotting similar to FIG. 9 and shows the squares of the sine wave and practically obtainable square wave.

Further information necessary to a basic understanding may be derived from a study of FIGS. 9 and 9A, wherein there is plotted 360 electrical degrees of four different waveforms, respectively referred to as a sine wave, a sine wave squared, a practical welding waveform, and a practical welding waveform squared.

Figure 10:
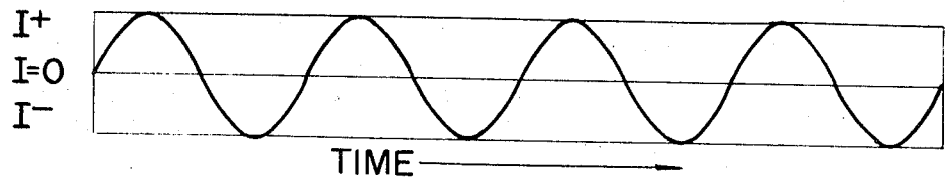
FIG. 10 is a diagram plotting a waveform of four cycles of a sine wave vs. time.
Figure 11:
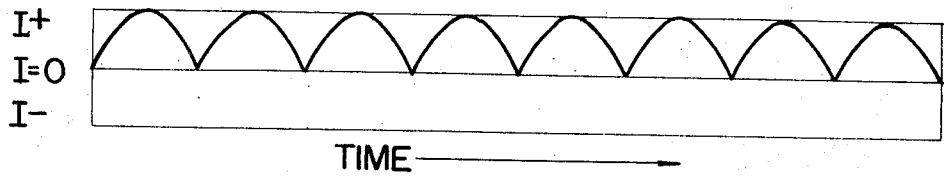
FIG. 11 is a diagram plotting a waveform of the magnitude of the 4 cycles of the sine wave of FIG. 10 vs. time.

In electrical engineering, it is common to refer to the magnitude of a quantity as its value irrespective of algebraic sign. For example, FIG. 10 shows a sine wave train of four cycles duration, while FIG. 11 shows the magnitude of the same sine wave for the same four cycles. The magnitude is always shown positive, by convention.

Figure 12:
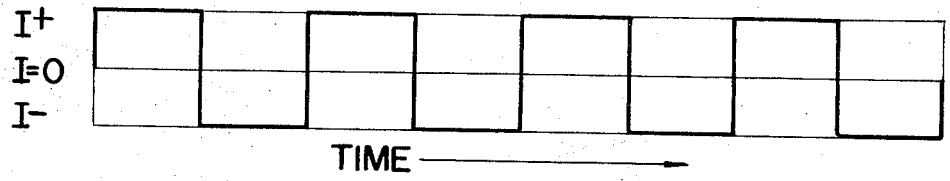
FIG. 12 is a diagram plotting a waveform of four cycles of a square wave vs. time.
Figure 13:
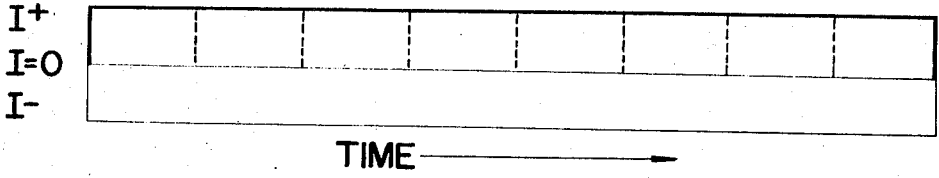
FIG. 13 is a diagram plotting a waveform of the magnitude of the four cycles of the square wave of FIG. 12 vs. time.

FIG. 12 shows four cycles of a square wave, and FIG. 13 shows the magnitude of the same square wave for the same four cycles. The magnitude of a square wave is always the maximum or positive value.

Figure 14:
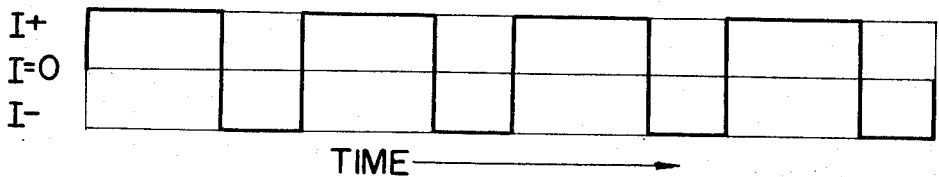
FIG. 14 is a diagram plotting a waveform of four cycles of an unsymmetrical rectangular wave vs. time.
Figure 15:
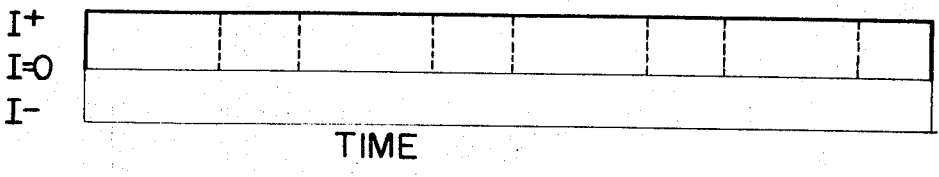
FIG. 15 is a diagram plotting a waveform of the magnitude of the four cycles of the unsymmetrical rectangular wave of FIG. 14 vs. time.

FIG. 14 shows four cycles of an unsymmetrical rectangular wave, and FIG. 15 shows the magnitude of this same wave. It is clear that the magnitude of rectangular waves is always the maximum or positive value and appears in a plot the same as unvarying DC. As in FIG. 13, the magnitude of a function, such as the current function shown, is never negative.

For reference, the values of the sine, the sine squared the practical welding waveform, and the square of the welding waveform as they are all illustrated in FIGS. 9 and 9A are listed below:

| ANGLES | SIN | SIN² | PSW | PSW² |
|---|---|---|---|---|
| 0° | 0.00 | 0.00 | 0.00 | 0.00 |
| 10° | 0.17 | 0.03 | 0.26 | 0.07 |
| 20° | 0.34 | 0.12 | 0.45 | 0.20 |
| 30° | 0.50 | 0.25 | 0.61 | 0.37 |
| 40° | 0.64 | 0.41 | 0.71 | 0.50 |
| 50° | 150 0.77 | 0.59 | 0.80 | 0.64 |
| 60° | 0.87 | 0.75 | 0.87 | 0.76 |
| 70° | 0.94 | 0.88 | 0.93 | 0.86 |
| 80° | 0.98 | 0.97 | 0.97 | 0.94 |
| 90° | 1.00 | 1.00 | 0.97 | 0.94 |
| 100° | 0.98 | 0.97 | 0.98 | 0.96 |
| 110° | 0.94 | 0.88 | 0.97 | 0.94 |
| 120° | 0.87 | 0.75 | 0.97 | 0.94 |
| 130° | 0.77 141 | 0.59 | 0.95 | 0.90 |
| 140° | 0.64 | 0.41 | 0.97 | 0.94 |
| 150° | 0.50 | 0.25 | 1.00 | 1.00 |
| 160° | 0.34 | 0.12 | 0.87 | 0.76 |
| 170° | 0.17 | 0.03 | 0.61 | 49 0.37 |
| 180° | 0.00 | 0.00 | 0.29 | 0.08 |
| 190° | −0.17 | 0.03 | −0.04 | 0.00 |
| 200° | −0.34 | 0.12 | −0.39 | 0.15 |
| 210° | −0.50 | 0.25 | −0.70 | 0.49 |
| 220° | −0.64 | 0.41 | −0.91 | 0.83 |
| 230° | −0.77 | 0.59 | −0.98 | 0.96 |
| 240° | −0.87 | 0.75 | −1.00 | 1.00 |
| 250° | −0.94 | 0.88 | −1.00 | 1.00 |
| 260° | −0.98 | 0.97 | −1.00 | 1.00 |
| 270° | −1.00 | 1.00 | −1.00 | 1.00 |
| 280° | −0.98 | 0.97 | −1.00 | 1.00 |
| 290° | −0.94 | 0.88 | −0.99 | 0.98 |
| 300° | −0.87 | 0.75 | −0.98 | 0.96 |
| 310° | −0.77 | 0.59 | −0.97 | 0.94 |
| 320° | −0.64 | 0.41 | −0.97 | 0.94 |
| 330° | −0.50 | 0.25 | −0.97 | 0.94 |
| 340° | −0.34 | 0.12 | −0.78 | 0.61 |
| 350° | −0.17 | 0.03 | −0.35 | 0.12 |
| 360° | 0.00 | 0.00 | 0.00 | 0.00 |

In order to obtain a practical evaluation as to the advantages of the welding waveform as compared to a perfect sine wave, the areas under the waveforms were measured and a value of 15.84 was obtained for the welding waveform as compared to a value of 11.34 for the sine wave. The net difference is 4.50 with the square of the welding waveform showing an increase of 39.7 percent over that of the square of the sine wave. This difference is similarly an approximation for the energy increase (per cycle) inasmuch as the weld energy is proportional to the square of the current, time remaining constant for a specific frequency and equal for a sine and welding waveform of the same frequency.

It is to be understood that the welding waveform illustrated in the drawings is one which has been repeatedly obtained during routine welding operations. Although the welding waveform is not a perfect square wave, a perfect square wave not being obtainable for the power requirements of a welding operation, it will be readily apparent that the nearly 40 percent increase in available power as compared to the power available with the perfect sine wave, the advantages of the invention are obvious. It is also pointed out here that while the welding waveform is not a perfect square wave, it is to be understood that a perfect sine wave also cannot be obtained in an inductive welding circuit and therefore, the advantages are even greater than the 40 percent increase in available power since the available power has been compared with that obtainable with a perfect sine wave.

It is pointed out that the envelope of the welding waveform between 0°–180° is different from between 180°–360° because of the effect of the turn-off circuitry in the power supply. Steps are presently being taken to improve the performance of the power supply with a view to the production of a waveform closer to that of an ideal square wave.

Now turning to metallurgical considerations governing extremely high quality resistance seam welding, one reason for wishing to use a square waveform is based on the logic that one wishes to eliminate completely the stitching effect along the length of a seam. Common descriptions of a resistance seam weld in prior literature call for several items not tolerable in very high quality seam welding.

First, one must avoid molten material because in addition to expelled molten metal causing weld defects, even the smallest amount, if expelled from the molten metal weld nugget, can be embedded in the welding electrodes and reduce their life and effectiveness by modifying the current density pattern.

Second, one must avoid cold spots which are unwelded or not satisfactorily welded. This means there should be no gaps between welds at points where less power is available.

The effect of these two restrictions is to set up a narrow latitude over which welding is feasible. The exactly precise temperature limits for the most practical commercial arrangement have not been set, but low carbon steel melts at a temperature in the vicinity of 1,500° C., and in general the higher the temperature below this point, the better the seam weld under the preferred conditions. In accordance with this invention, welding occurs at high line speeds, and so forging time is limited. Metallurgists have estimated that one should work at a temperature of about 1,000°–1,450° C., and that ideally, the temperature should be maintained within ±5 percent of the value within that range deemed optimum for a specific material.

It is particularly pointed out here that any piece of this latitude that is consumed by unnecessary fluctuation of one variable allows less latitude in fluctuation of other variables.

Figure 16:
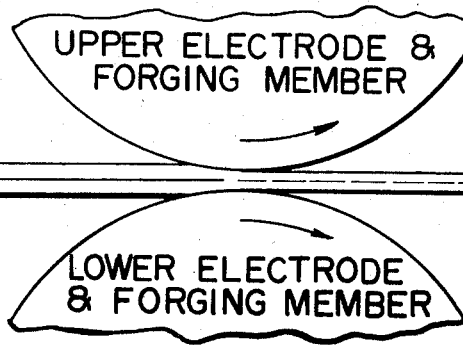
FIG. 16 is an elevational view diagrammatically showing the geometry of welding apparatus for conventional seam welding.

The fact that both of the above defects are experienced in conventional seam welding is emphasized in Chapter 4 entitled "Seam Welding" in the Third Edition of the Resistance Welding Manual, Volume 1, Published by the Resistance Welder Manufacturers Assoc., Philadelphia. FIG. 16 is patterned after FIG. 1 of the referenced Chapter, showing simple seam welding using two rotating electrodes; and FIGS. 17A and 17B are copied directly from FIG. 2 of the referenced Chapter, illustrating the difference between roll seam welding (17A) and roll spot welding (17B). In the explanation of FIG. 2 in the Manual, there is stated "roll-seam welding, or simply seam welding as it is commonly called, consists of making a series of overlapping spot welds by means of one or two rotating wheel electrodes without opening the electrodes between spots" . . . . . "the principle is exactly the same as for spot welding, except for the substitution of the welding wheels for the spot welding points or electrodes" . . . . . "If the spots are not overlapping, the joint is not necessarily gas tight and is then called a roll-spot weld." . . . . "due to the rolling action of the electrode or electrodes each spot is more or less oval in shape."

Thirdly, one must operate at the lowest possible frequency consistent with the other objectives. For a given welding speed, say 40 inches per second, one might attempt a sinusoid with a frequency high enough to give no stitching effect of any consequence. At such a speed, which is 2,400 inches per minute, or 200 feet per minute, or 0.04 inch per millisecond, a frequency of 2,000 cycles per second would give 4 peaks per millisecond, or 4 peaks per 0.04 inch, or a wavelength between peaks of 0.01 inch. Since there is only a very small amount of heat flow along the length of a seam weld, and this flow governs the amount of stitching, the actual amount of stitching depends on the relative values of thermal conductivity and the variables just discussed.

The forging time is some fraction of the time the workpiece is actually under pressure by the rolls. In so-called solid phase welding, there is no melting of material; rather the surfaces are heated and then urged together, the heat assisting in obliterating the boundary between the two members of the workpiece by promoting metallurgical grain growth across the boundaries. Evidently when heating first starts due to current flow in the workpiece, the temperature has not yet risen appreciably, so that forging is relatively ineffective.

Actually, if for a given point in the seam, forging begins when the wave of heating current is passing through zero, such forging will be much less effective than if heating is a maximum. At high seam welding speeds, every possible instant of forging time must be used. This is the basic reason that a completely continuous and unvarying heating current waveform would be ideal.

At very low speeds, it may be argued that heat flows along the length of the seam, but is should be remembered that any heat which flows into a gap between stitches lowers the temperature of the region from which this thermal energy comes. Thus, heat flow between stitches may eventually make the temperature uniform, but it will everywhere by less than the optimum value.

Due to the basic nature of power being directly proportional to the square of current or voltage, one is penalized for any departure from a perfect square waveform. FIGS. 9 and 9A show that the difference between a sine wave and its square is considerably greater in curve area than the difference between a practically realizable square wave and its square.

Assuming that the optimum power setting for a given type of welding were to be at a relative amplitude of 0.95 and that satisfactory welding could be achieved anywhere from the 90 percent level to the 100 percent level, the square of the sinusoidal waveform would be within the proper range from about 72° to 108° and from 252° to 288° — a total of about 72° out of 360°. The practical square wave on the other hand maintains its square within the range of 0.95 ±0.05 from about 76° to 156° and from 224° to 334° — a total of about 190° out of 360°.

Reference to the practical waveform is made only to emphasize that an idealized wave if not essential for many types of welding. A range of ±5 percent of power has been found desirable for low carbon steel, which metallurgists describe as having a relatively wide plastic range. It may be necessary for other materials to more closely approach the ideal square wave.

It should be understood that a limited train or burst of rectangular waves may be employed wherein the duration of the portion of one polarity is not identical to the duration of the portion which is the opposite polarity. Such a wave is illustrated by FIG. 14 where the positive going portion of the cycle is twice the duration of the negative going portion of the cycle. Such a waveform has some, but not all, of the advantages of the square wave. The magnitude of the function represented is always equal to the maximum value of the function; however, the frequency spectrum is more complex, and the maximum length of time an unvarying current flows is longer with respect to the repetition frequency of the wave, thus reducing the effectiveness of arc suppression by current polarity reversal.

If one wishes to maintain the energy within a 5 percent margin with a sine wave, appreciable energy is required to flow longitudinally during the time the weld is under pressure of the rolls. If the length along the seam actually under pressure is 0.050 inch, and the speed of passage under the rolls is, say 40 inches per second, the time is (0.05/40) = 0.00125 second. Now, the velocity of heat energy flow along the length of the seam is zero when any given point is at the same temperature as an adjacent point, and only becomes significant after substantial heating creates a difference in temperature. If a sine wave is applied having a frequency of say, 2,000 cycles per second, one will have twice as many power peaks — 4,000 per second — and at 40 inches per second, these peaks will be spaced at intervals of (40/4000) = 0.01 inch.

Figures 17, 18, 19:
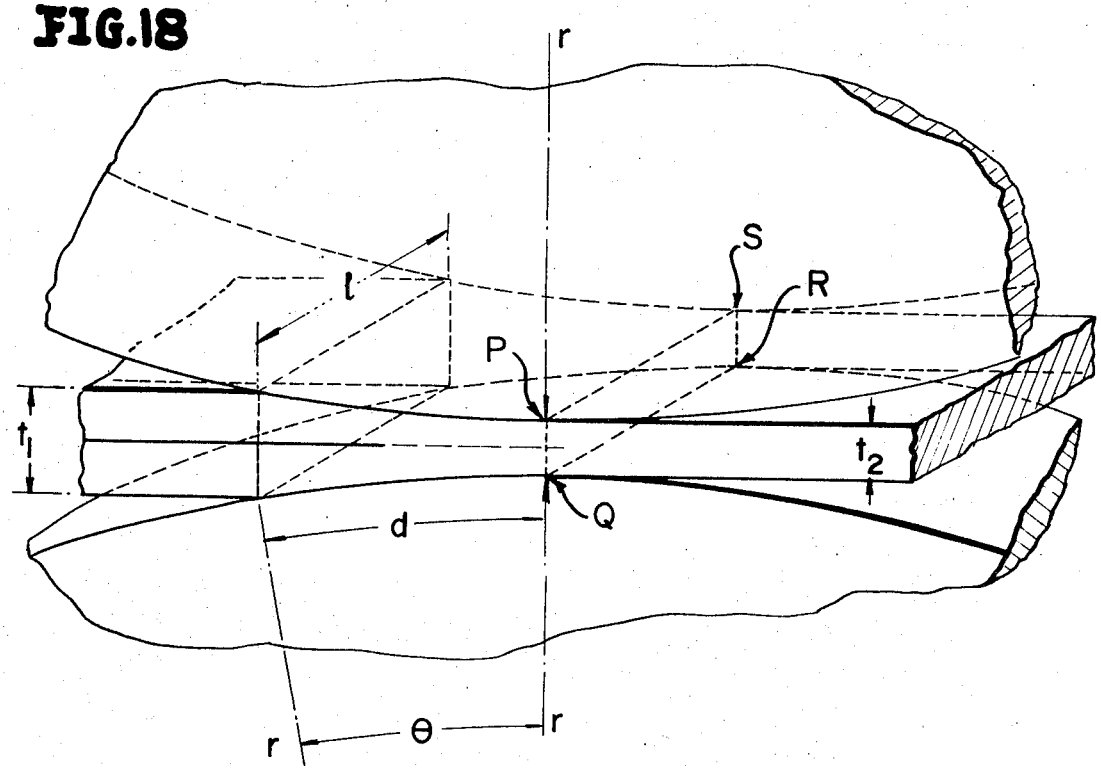
FIG. 18 is a diagrammatical perspective view showing the surface area of the workpiece in contact with the electrodes and the volume of material contained therebetween.
FIG. 19 is a schematic of the welding circuit provided in accordance with this invention.

Now one considers the actual heat flow for a geometry illustrating high speed welding of thin gage materials such as that shown in FIG. 18. In that Figure, two thicknesses of material advance from the left side, having a total initial thickness $t_1$. They are in contact symmetrically over a circumferential length $d$ with upper and lower seam welding electrodes having the same radii, $r$. The contact angle with the rolls is $\theta$. The material is reduced to a single thickness $t_2$, as the two thicknesses are forged together. One considers a lap width $l$ under the electrodes. The dotted lines define an active volume of constantly flowing material. The great majority of heating and forging must take place during passage through this volume.

At a chosen representative speed of 40 inches or about 100 cm. per second, one can approximate available time. From experience one may expect the contact distance $d$ to be about 0.1 cm. The time any given point will reside within the active volume is (0.1/100) – 0.001 second, or 1 millisecond. There has already been shown that at this same speed, with a sinusoidal frequency of 2,000 cycles, the distance between power peaks would be 0.01 inch, or roughly 0.025 cm.

If it is argued that series inductance of the electrical load consisting of the workpiece is very small at a given frequency, then the current and voltage in the load are in phase each with the other, and the instantaneous load power is proportional to the square of the current waveform. It is well known that the normal sine function when squared has a relatively sharp or spiked crest or peak as shown in FIG. 9A.

If it is argued that series inductance becomes significant at a given frequency, so that voltage and current are not in phase, then the power supply may still be designed such that the power waveform is a square wave of the type described. In any load, one may speak of the waveforms of voltage, current, and power — all with relationships well known in the electrical engineering art. It is the power waveform which is directly related to the pattern of heating in the weld seam.

If a sufficiently high frequency is used to make the effects of the inductance of the small volume of the workpiece significant, then in any practical machine there will be effects of much greater magnitude due to the inductances of the relatively long leads from the power supply to the workpiece, and the resistance, hysteresis, and eddy current losses caused in the leads themselves and in machine members of steel, iron, or non-ferrous metals which must be placed closely adjacent to the leads from the power supply.

The inductance of a busbar of copper with cross section adequate to handle currents on the order of 2,000–10,000 amperes may be calculated from the expression $$Lo = .005\, a\left(2.3 \log_{10} \frac{2a}{b+c} + 0.5 + 0.22 \frac{b+c}{a}\right)$$

(Adapted from Terman, Radio Engineers' Handbook, First Edition, p. 51, McGraw Hill, New York, 1943).

Where $a$ is the length of the bar, $b$ is its width, and $c$ its thickness — all in inches. If $a=20$, $b=2$, and $c=0.5$, we have $$Lo = (.005)(20)\left(2.3 \log_{10} \frac{40}{2.5} + 0.5 + [.22]\left[\frac{2.5}{20}\right]\right)$$

$$= (.23 \log_{10} 16) + (.05) + (.00275)$$

$$= 0.277 + .05 + .003 \approx 0.33 \text{ microhenry}$$

At the frequency used in previous examples, 2000 cycles, the inductive reactance $X_L$ is:
$X_L = 2\pi f l = (6.28)(2,000)(3.3)(10^{-7}) = 12.6 \times 3.3 \times 10^{-4}$ ohms, or 4,160 microhms It has been found in high speed welding that a voltage across the secondary of the welding transformer must be about 10 volts, with a current of 10,000 amperes peak. The entire secondary loop impedance is then, very roughly $Z=E/I = 0.001$ ohm, or 1,000 microhms. It is easily seen that even at 2,000 cycles, inductive reactance is a major problem. Indefinite increase of the frequency to eliminate stitching brings on other serious problems. It may be argued that inductance can be reduced by placing two parallel leads in close proximity. Terman, ibid. p. 52, gives the formula for a circuit of two parallel bars of:

$$Lo = 0.01\, a\left(2.3 \log_{10} \frac{D}{b+c} + 1.5 - \frac{D}{a} + .22 \frac{b+c}{a}\right)$$

where $D$ is center spacing of the conductors in inches. From practical considerations in a machine, some portions of the conductor length cannot be closely spaced. On the average, the spacing might be 1 inch.

Then, of other dimensions remaining the same:
$Lo = (0.01)(20)[2.3 \log_{10} 0.4 +1.5 -0.05 +0.22(0.125)]$
$= (0.2)(0.565)$
$= 0.113$ microhenries, a reduction by a factor of 3. The corresponding inductive reactance is still 1,419 microhms at 2,000 cycles, and 7095 microhms at 10,000 cycles.

In addition, increases in these values may occur when ferromagnetic structures, closed conductive loops, and other elements are in close proximity to the conductors.

The resistance of a conductor also increases with frequency due to skin effects. For the conductor described above, which if pure copper has a resistance of about 0.27 microhms per centimeter of length, a chart on page 34 of Terman, ibid, plots the ratio of AC to DC resistance as a function of a parameter p where:
$p = (8\pi f/R_{dc} \times 10^9)^{1/2}$ where $f$ is frequency in cycles and $R_{dc}$ is the DC resistance in ohms per centimeter. Thus:
$p = (16,000\pi/0.27 \times 10^3)^{1/2} = (186)^{1/2} = 13.6$ For a width to thickness ratio of 4 as used above, the ratio of AC to DC resistance would be nearly 4.0. The DC resistance for pure copper would be 13.5 microhms, and the AC resistance in excess of 50 microhms.

This advantage may be mitigated to some extent by use of stranded cables; however, further increases in resistance are caused by proximity effects as the opposing circuit conductors are brought closer together.

To illustrate the seriousness of the lead inductances and resistances one may calculate the resistance between the electrodes of the volume of material being heated. For the geometry shown in FIG. 18, we may approximate the desired value by calculating the resistance between two faces of a parallelopiped having faces with areas ($a \times d$) and a length along the conductor of $t_2$. Again, from experience one may chose $a=0.1$ cm., $d=0.1$ cm. and $t_2=0.025$ cm. The resistivity $p$ of (for example) iron (or steel) is roughly 10 microhms per centimeter cube. Thus:
$R = pL/A = pt_2/A = (10)(0.025)/(0.1)(0.1)$
$= 25$ microhms — the "body resistance" of the load.

Now in resistance welding there are resistances at the boundaries between the several layers of material, as shown in FIG. 19. That Figure is a circuit diagram of the welding apparatus, which is illustrated in more detail in FIGS. 20 and 21.

In FIG. 20 there is illustrated a resistance welding apparatus which is generally referred to by the numeral 10 and which apparatus includes a power supply unit 11 which delivers a predetermined power supply to a primary 12 of a transformer 13. The transformer 13 also includes a secondary winding 14 to which there are connected leads 15. The leads 15 are connected to rotary joints 16 of an upper welding electrode 17 and a lower welding electrode 18. The work to be welded is passed between the electrodes 17 and 18.

In FIG. 21 there is illustrated a slightly modified form of the resistance welding apparatus 10 wherein in lieu of the electrodes being roller electrodes, the electrodes are in the form of thin strips or ribbons 20, 21 which pass over and are guided by contact forming members 22 which form electrical joints with the electrodes 20, 21.

Now referring again to FIG. 19, the various resistances and inductances of the power supply circuit are shown. In the transformer 13, the secondary winding has a resistance R and an inductance L. The leads 15 from the transformer to the electrodes have an equivalent resistance $R_L$ and an inductance $L_L$.

At the welding station there are other resistances which include the resistance of the upper joint between the rotating electrode and its power supply lead $R_{uj}$ and the resistance of the corresponding lower joint $R_{Lj}$. There is also a resistance to current flow at the interface of the upper electrode 17 and the work, which resistance is identified as $R_{ues}$. A similar resistance $R_{Les}$ exists between the lower electrode and the surface of the workpiece being welded. Upper and lower "body" resistances are $R_{ub}$ and $R_{Lb}$, respectively.

A further resistance to flow of current is at the interface of the two workpieces, which resistance is identified as resistance $R_{ss}$.

In accordance with this invention, the power source 11 is so designed whereby the current flowing into the work from the electrodes is provided either as continuous square waves or a burst of square waves — either synchronous or non-synchronous with the turn-on or turn-off. It may also be said that the wave of the current directed through the work W is a modified or practical square wave.

It is apparent that for ideal welding, we only need heat at the interface between the 2 pieces, so desirably the only power loss would be that due to the resistance $R_{ss}$. There is, however, power loss in all of the above mentioned resistances. In addition, there are voltage drops across the inductances L and $L_L$. Furthermore, the welding fixture may have other inductive reactances which resist the flow of current to the electrodes. The power losses, except that at the surface-to-surface contact of the parts to be welded, must be held to a minimum so that a maximum power may be available for the heating of the contacting surfaces. In view of the fact that the voltage drop across the inductances linearly increased with an increase in frequency, it will be readily apparent that for this reason alone, it would be desirable to hold the frequency to a minimum.

From experience, we are able to specify reasonable target value ranges from the elements in FIG. 19, on the basis that the secondary voltage $E_s$ and current $I_s$ are as specified, 400 cycles being chosen as the fundamental frequency:

|  | R Microhms | L Microhenries | $X_L$ 400ν Microhms |
|---|---|---|---|
| Source: | R=100–300 |  |  |
| Line: | $R_L$=20–50 | $L_L$=0.03 | $X_{L_L}$ =75 |
| Electrodes: | $R_{uj}$=10–25 |  |  |
|  | $R_{Lj}$=10–25 |  |  |
|  | $R_{ues}$=40–100 |  |  |
|  | $R_{Les}$=40–100 |  |  |
| Workpiece: | $R_{ub}$=15–50 |  |  |
|  | $R_{Lb}$=15–50 |  |  |
| Weld Zone: | $R_{ss}$=150–300 |  |  |
| Total Secondary: | $R_t$=400–1,000 | $L_t$=1.0 | $X_{L_t}$=2,500 |

It has been found that with the modified wave configuration of this disclosure satisfactory seam welds may be readily formed at a much higher rate than was heretofore possible. In FIG. 22, there is schematically shown a comparison of the temperature within work heated utilizing current having a practical square of flat top waveform in accordance with this invention and the temperature in like work wherein heat is supplied by current having the sine waveform.

At the present time thin gauge metal, such as that suitable for the manufacture of can bodies, has been successfully welded. The can bodies, having a base metal thickness ranging from 0.004 inch to 0.011 inch, have been successfully welded at speeds in excess of 100 feet per minute. The fundamental frequency of the current is preferably on the order of 400–500 cycles per second although it is feasible to operate the apparatus of this invention at frequencies ranging from 100 to 1,000 cycles per second. In such instances, the welding current has been 5,000–10,000 amperes at 5–10 volts.

A square wave is well known in the electrical communications field but has not been applied to an appreciable extent in industrial practice up to the present time. One of the most common applications in the field of electrical communications is in the testing of signal amplifiers for their amplitude and phase response over a wide range of frequencies. (See Terman, loc. cit., pp. 968–70.)

An excellent analysis of a square wave is given in Fink's *Principles of Television Engineering*, McGraw Hill, New York, 1940, pp. 190–191. If the overall amplitude of the wave is assumed to be 1 and the total duration of a complete (+ and −) cycle of $1/f$ seconds, where $f$ is the fundamental or lowest frequency of the series, and the origin where time is zero ($t=0$) is placed at the center of the wave, as shown in FIG. 23, one can then describe a single cycle of the ideal or perfect square wave by $E(t) = -0.5$ (from $t = -1/2f$ to $t = 0$) and $E(t) = +0.5$ (from $t=0$ to $t=+1/2f$). The function can be expressed all in sine or in cosine terms depending on choice of origin ($t = 0$). For the former, Fourier analysis allows expression of the complex wave in terms of a fundamental frequency and harmonically related overtones or harmonics. As shown in FIGS. 24 and 25, the more harmonics that are included, the better is the approximation of the square wave. FIG. 24 shows an approximation of a square wave only by one harmonic, and also by 13 harmonics, while FIG. 25 shows the same approximation by 5 and by 21 harmonics respectively. FIGS. 23 – 25 are from Fink, loc. cit.

The actual mathematical representation of a square wave is:

$$A_n = \int_{-1/2f}^{+1/2f} [E(t) \sin (2\pi nft) dt]$$

where $A_n$ is the relative amplitude of the $n$th harmonic; $E(t)$ is a function which describes ($E$) voltage as a function of ($t$) time; n is the number of the harmonic; $f$ is frequency in cycles per second; and $t$ is time in seconds.

The expression for $A_n$, after appropriate mathematical manipulations, may be written as:

$$A_n = \frac{1}{\pi n} [1 - \cos (n\pi)]$$

For $n = 2,4,6$, etc. cos $n\pi = +1$, hence $A_2, A_4, A_6$ etc. $= 0$. For n = 1, 3, 5, etc. cos $n\pi=-1$, hence $A_n = 2/\pi n$. The waveform, as arranged has no DC component, hence $A_o = 0$. The (Fourier) series is then:

$$E(t) = \frac{2}{\pi} \left( \frac{\sin 2\pi ft}{1} + \frac{\sin 2\pi 3ft}{3} + \frac{\sin 2 5\pi ft}{5} + \ldots \right)$$

The series contains components of every odd harmonic, each being inversely proportional in amplitude to its frequency. At the 21st harmonic, for example, the amplitude is one 21st, or slightly less than 5 percent, that of the fundamental.

For the purposes of this invention, it should be clearly noted that most of the energy is concentrated at the lowest frequencies. Since power is generally proportional to the square of the amplitude of voltage or current, the power in each of the harmonics is relatively lower than the amplitudes. This means that by using a square wave one gets the benefit of using high frequencies, but not much power must be supplied to obtain such a benefit. A square wave is indeed a complete spectrum of energy, time phased such as to be the most useful for purposes such as welding a continuous seam. This is additional evidence that merely increasing the frequency of a sine wave is inferior to adding a series of harmonics which are properly time phased with respect to the fundamental frequency.

The exposition of harmonic content is necessary because of the infinite series that is required to reproduce a perfect square wave. The practical square wave is a matter of engineering judgement as to the final degree of approximation to the ideal.

A square wave is preferable to ordinary DC because, as was previously stated, current reversal is the optimum way of extinguishing an electrical arc.

Either through malfunction of the electrical power supply or through a mechanical malfunction such as lifting an electrode off of a seam before power is turned off, or through contamination of work or electrodes by non-conducting spots of dirt, etc. contact between electrode and workpiece may be interrupted while power is being applied. An all too frequent consequence is an electrical arc between one or both electrodes and the workpiece. In such an arc, metal is vaporized and melted at the metallic surfaces adjacent to the arc, producing a copious supply of ions and electrons which tend to prolong the arc long enough to damage one or both surfaces when a DC power supply is used.

Since the polarity of the voltage in a square wave reverses twice each period, a square wave provides automatic arc extinguishing. Even relatively short duration arcs can be harmful in high reliability welding processes because even if there is not noticeable erosion of liquid or gasified metal, many chemical reactions may be enhanced in the arc, such as oxidation or even the formation of poorly conducting hydrocarbons. Thus for arc suppression, the shorter the period of a square wave, the better.

Finally, there is applied a voltage waveform dictated by circuit values necessary such that the power waveform across the load is a square wave. If inductive reactance is high, or if phase shift is not linear, there is impressed the necessary voltage to compensate. Since the phase relation ships of the harmonics relative to the fundamental are necessary to preservation of a true square power waveform.

Although to date the maximum speed of welding has been only slightly over 100 feet per minute, speeds in excess of 500 feet per minute are realizable.

It is to be understood that for all practical purposes the voltage of the power supplied to the electrodes will remain constant and as a result, the current of the power will have substantially the same waveform as the power waveform. Accordingly, no distinction has been made in FIGS. 8 and 9 between power and current waveforms.

Although only a preferred embodiment of the invention has been specifically illustrated and described herein, it is to be understood that minor variations may be made in the invention without departing from the spirit of the invention as defined in the appended claims.

I claim:

1. A resistance welding apparatus for forming a continuous seam weld in lapped portions of workpieces comprising a pair of seam welding electrodes mounted in opposed and spaced relation for the passage of work therebetween, and electrical power supply means for supplying through said welding electrodes to work disposed and passing therebetween power having practically available square waveforms whereby power will be applied to work for a maximum time during each cycle of the current producing said power, said power being supplied in the form of controlled bursts of waveforms.

2. A method of lap seam welding thin gauge metal having a thickness ranging from 0.004 inch to 0.011 inch comprising the step of arranging edge portions of metal into lapped relation, passing said lapped edge portions between a pair of opposed roller electrodes and delivering electrical power having a practically available square waveform into said lapped edge portions with said electrical power resistance heating opposed surface portions of said lapped edge portions to a temperature short of fusion yet sufficiently high to be plastic and forge weldable together, and applying sufficient pressure on said lapped edge portions to forge weld together said plastic surface portions, said electrical power being supplied in the form of a controlled burst of waveforms starting with a zero amplitude.

* * * * *